(12) United States Patent  (10) Patent No.: US 8,728,952 B2
Zhu  (45) Date of Patent: May 20, 2014

(54) COATING METHOD OF AN ALIGNMENT FILM

(75) Inventor: MeiNa Zhu, Guangdong (CN)

(73) Assignee: Shenzhen China Star Optoelectronics Technology Co., Ltd., Guangdong (CN)

(*) Notice: Subject to any disclaimer, the term of this patent is extended or adjusted under 35 U.S.C. 154(b) by 0 days.

(21) Appl. No.: 13/638,073

(22) PCT Filed: Aug. 31, 2012

(86) PCT No.: PCT/CN2012/080839
§ 371 (c)(1),
(2), (4) Date: Sep. 28, 2012

(87) PCT Pub. No.: WO2014/029133
PCT Pub. Date: Feb. 27, 2014

(65) Prior Publication Data
US 2014/0057449 A1    Feb. 27, 2014

(30) Foreign Application Priority Data
Aug. 22, 2012  (CN) .......................... 2012 1 0299010

(51) Int. Cl.
H01L 21/31  (2006.01)
G02F 1/1337  (2006.01)

(52) U.S. Cl.
USPC .......................... 438/758; 438/759; 349/123

(58) Field of Classification Search
USPC .......................... 438/758, 759, 975; 349/123
See application file for complete search history.

(56) References Cited

U.S. PATENT DOCUMENTS

2005/0237462 A1* 10/2005 Nguyen et al. ................. 349/130
2007/0273812 A1* 11/2007 Bone et al. ..................... 349/113
2008/0230933 A1*  9/2008 Tazaki et al. .................. 264/1.31

* cited by examiner

Primary Examiner — Julia Slutsker
(74) Attorney, Agent, or Firm — Kirton McConkie; Evan R. Witt

(57) ABSTRACT

Provided is a coating method of an alignment film, including: providing a board, having a substrate, the substrate forming an alignment liquid coating area thereon; forming a barrier structure around the alignment liquid coating area; coating an alignment liquid in the alignment liquid coating area, wherein the barrier structure blocks the alignment liquid to diffuse outside the alignment liquid coating area; and curing the alignment liquid to form an alignment film. The present invention may assure that the formed alignment film can not affect other areas adjacent to the alignment liquid coating area.

17 Claims, 5 Drawing Sheets

COATING METHOD OF AN ALIGNMENT FILM

BACKGROUND OF THE INVENTION

1. Field of the Invention

The present invention relates to a display panel manufacturing technology field, and more particularly to a coating method of an alignment film.

2. Description of the Prior Art

With the continuous development of a liquid crystal displaying technology, the demand for the quality of the liquid crystal display becomes more and more high.

Please refer to FIG. 1, FIG. 1 is a schematic view of a top plan structure of a TFT (Thin Film Transistor) board in the prior art.

The TFT board comprises a glass substrate 10. The glass substrate 10 forms a frame glue coating area 11 and an alignment liquid coating area 12. The alignment liquid coating area 12 covers a displaying area (not shown in the drawing). The frame glue coating area 11 is used to be coated with the frame glue, and the alignment liquid coating area 12 is used to be coated with the alignment liquid to form an alignment film (PI).

In the prior art, the alignment film is generally printed and formed by an alignment film inkjet printing technology. First, it is spraying an alignment liquid in the alignment liquid coating area 12, and then the alignment liquid is cured to form the alignment film. But after spraying the alignment liquid, because the liquid drops of the alignment liquid can be affected by the gravity thereof to diffuse outside the alignment liquid coating area 12, such as diffuse onto the frame glue coating area 11, it will result that the formed alignment film extends outside the alignment liquid coating area 12. For example, a boundary of the alignment film is wavy or extends onto the frame glue coating area 11, so it will affect the adhesive force of the frame glue of the frame glue coating area 11 and will affect the displaying effect of the displaying area.

In conclusion, during the course of spraying the alignment liquid in the alignment liquid coating area 12 to form the alignment film, the diffusion of the alignment liquid can affect the precision of the alignment film, particularly affect the boundary precision of the alignment film, and further affect other areas adjacent to the alignment liquid coating area.

BRIEF SUMMARY OF THE INVENTION

One object of the present invention is to provide a coating method of an alignment film to solve the technical problems of the diffusion of an alignment liquid affecting the position precision of an alignment film, particularly affecting the boundary precision of the alignment film, and further affecting other areas adjacent to an alignment liquid coating area during the course of spraying the alignment liquid in the alignment liquid coating area to form the alignment film in the prior art.

For solving above problems, the present invention provides a coating method of an alignment film, which comprises following steps of:

providing a board, having a substrate, the substrate forming an alignment liquid coating area and a frame glue coating area thereon, the frame glue coating area surrounding the alignment liquid coating area, and the alignment liquid coating area and the frame glue coating area defining a space therebetween;

forming a barrier structure in the space between the alignment liquid coating area and the frame glue coating area, and the barrier structure being built closely around the alignment liquid coating area;

coating an alignment liquid in the alignment liquid coating area, wherein the barrier structure blocks the alignment liquid to diffuse outside the alignment liquid coating area;

curing the alignment liquid to form an alignment film; and removing the bather structure.

In one embodiment of the present invention, the barrier structure is formed by a hardenable molding polymer material.

In one embodiment of the present invention, the polymer material is a single polymer material or a mixed polymer material.

In one embodiment of the present invention, the polymer material is α-amino acrylic acid ethyl ester.

In one embodiment of the present invention, the step of removing the barrier structure specifically comprises:

heating the barrier structure for melting and removing the barrier structure.

In one embodiment of the present invention, the step of removing the barrier structure specifically comprises:

spraying a solvent on the barrier structure to dissolve the barrier structure in the solvent and remove it.

In one embodiment of the present invention, the barrier structure is protruding with respect to the substrate, and a cross section of the barrier structure is perpendicular to a length direction of the barrier structure.

In one embodiment of the present invention, the cross section of the barrier structure is a triangle, a square or a trapezoid.

The other object of the present invention is to provide a coating method of an alignment film to solve the technical problems of the diffusion of an alignment liquid affecting the position precision of an alignment film, particularly affecting the boundary precision of the alignment film, and further affecting other areas adjacent to an alignment liquid coating area during the course of spraying the alignment liquid in the alignment liquid coating area to form the alignment film in the prior art.

For solving above problems, the present invention provides a coating method of an alignment film, which comprises following steps of:

providing a board, having a substrate, the substrate forming an alignment liquid coating area thereon;

forming a barrier structure around the alignment liquid coating area;

coating an alignment liquid in the alignment liquid coating area, wherein the barrier structure blocks the alignment liquid to diffuse outside the alignment liquid coating area; and curing the alignment liquid to form an alignment film.

In one embodiment of the present invention, the barrier structure is formed by a hardenable molding polymer material.

In one embodiment of the present invention, the polymer material is a single polymer material or a mixed polymer material.

In one embodiment of the present invention, the polymer material is α-amino acrylic acid ethyl ester.

In one embodiment of the present invention, the substrate further forms a frame glue coating area thereon, the frame glue coating area surrounds the alignment liquid coating area, and the alignment liquid coating area and the frame glue coating area define a space therebetween, the barrier structure is formed in the space between the alignment liquid coating area and the frame glue coating area, and the barrier structure is built closely around the alignment liquid coating area.

In one embodiment of the present invention, after the step of curing the alignment liquid to form an alignment film, the method further comprises a following step of:

removing the barrier structure.

In one embodiment of the present invention, the step of removing the barrier structure specifically comprises:

heating the barrier structure for melting and removing the barrier structure.

In one embodiment of the present invention, the step of removing the barrier structure specifically comprises:

spraying a solvent on the barrier structure to dissolve the barrier structure in the solvent and remove it.

In one embodiment of the present invention, the barrier structure is protruding with respect to the substrate, and a cross section of the barrier structure is perpendicular to a length direction of the barrier structure.

In one embodiment of the present invention, the cross section of the barrier structure is a triangle, a square or a trapezoid.

Comparing with the prior art, the coating method of the alignment film provided in the present invention is: first forming the barrier structure around the alignment liquid coating area on the substrate, then coating the alignment liquid in the alignment liquid coating area, wherein the barrier structure blocks the alignment liquid to spread outside the alignment liquid coating area, and finally curing the alignment liquid to form the alignment film. Obviously, the present invention may block the alignment liquid to diffuse by the barrier structure, thereby controlling the position precision of the alignment film, particularly controlling the boundary precision of the alignment film, and assuring that the formed alignment film can not affect other areas adjacent to the alignment liquid coating area.

For more clearly and easily understanding above content of the present invention, the following text will take a preferred embodiment of the present invention with reference to the accompanying drawings for detail description as follows.

DETAILED DESCRIPTION OF THE PREFERRED EMBODIMENTS

Figure 1:
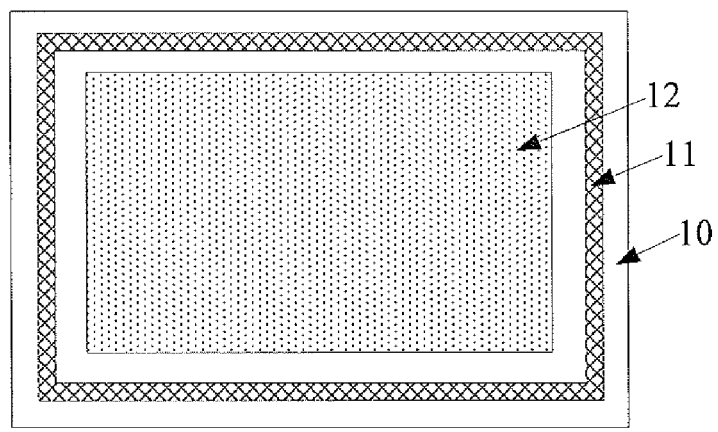
FIG. 1 is a schematic view of a top plan structure of a TFT board in the prior art.

The following description of every embodiment with reference to the accompanying drawings is used to exemplify a specific embodiment, which may be carried out in the present invention. Directional terms mentioned in the present invention, such as "top", "bottom", "front", "back", "left", "right", "inside", "outside", "side" etc., are only used with reference to the orientation of the accompanying drawings. Therefore, the used directional terms are intended to illustrate, but not to limit, the present invention. In the drawings, the components having similar structures are denoted by the same numerals.

Figure 2:
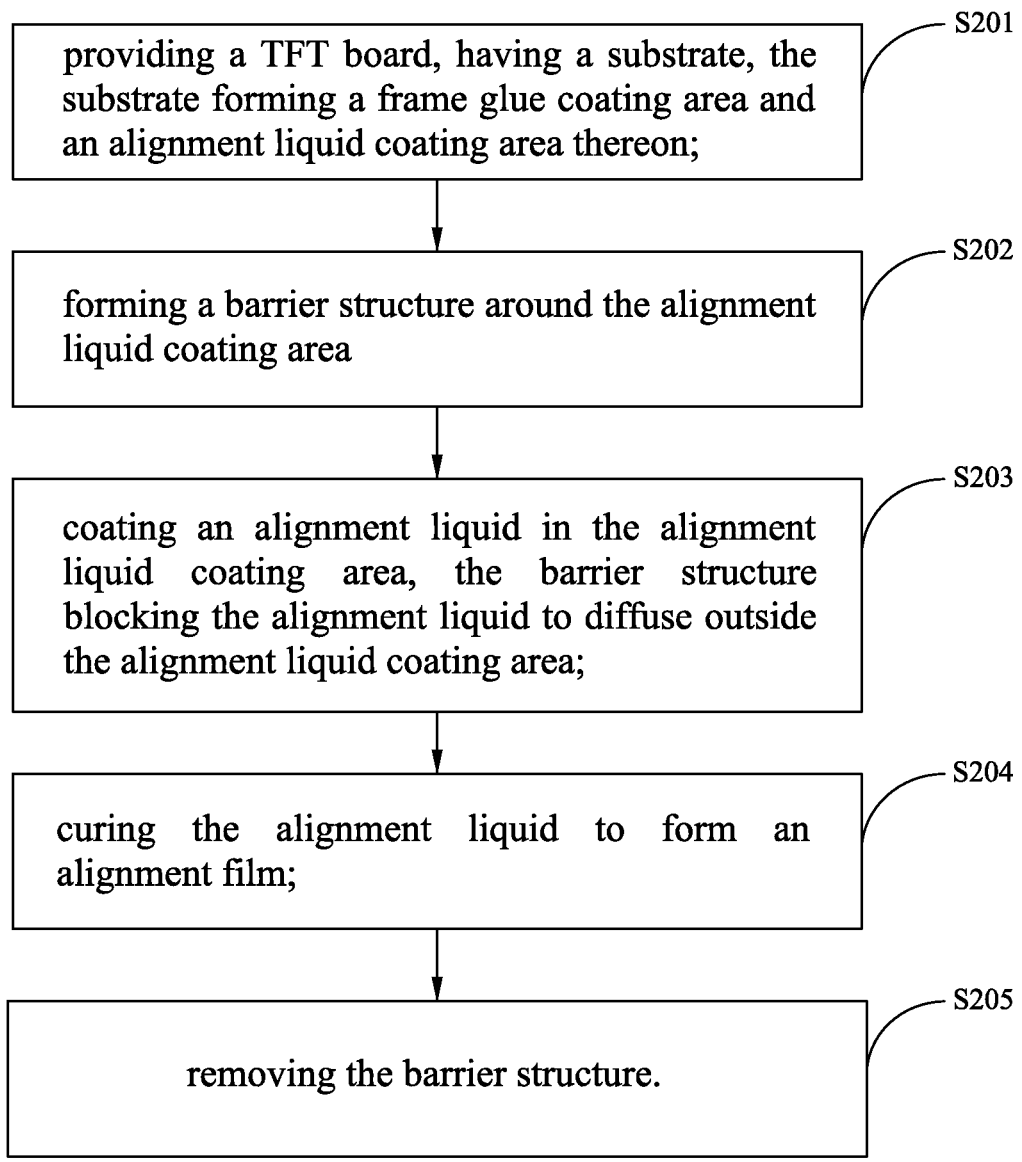
FIG. 2 is a flow diagram of a preferred embodiment of a coating method of an alignment film of the present invention.

Please refer to FIG. 2, FIG. 2 is a flow diagram of a preferred embodiment of a coating method of an alignment film of the present invention.

In the step S201, it is providing a TFT board.

Figure 3:
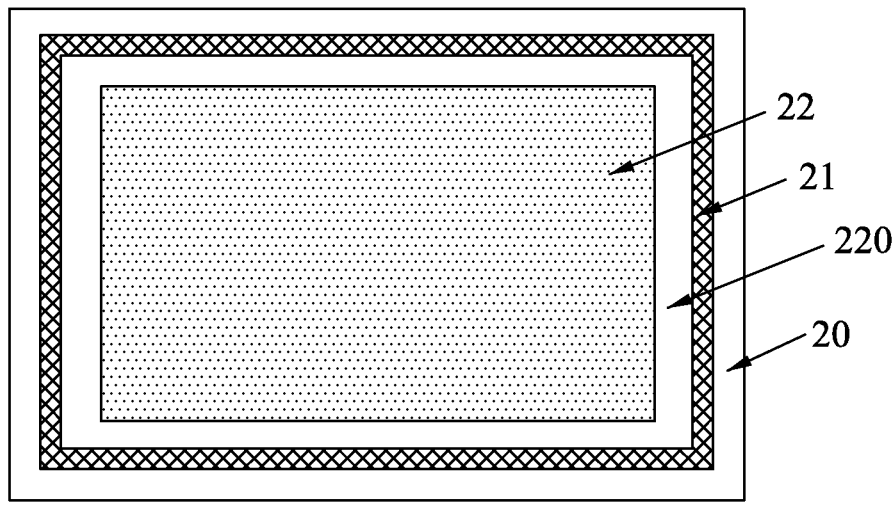
FIG. 3 is a structure schematic view of a TFT board provided before coating an alignment film in the coating method of the alignment film of the present invention.

Please refer to FIG. 3, the TFT board comprises a substrate 20, the substrate 20 forms a frame glue coating area 21 and an alignment liquid coating area 22 thereon. Wherein the frame glue coating area 21 is used to be coated with a frame glue, and the alignment liquid coating area 22 is used to be coated with an alignment liquid to form an alignment film (PI). The frame glue coating area 21 surrounds the alignment liquid coating area 22, and there defines a space 220 between the frame glue coating area 21 and the alignment liquid coating area 22.

In the step S202, it is forming a bather structure around the alignment liquid coating area 22.

Figure 4:
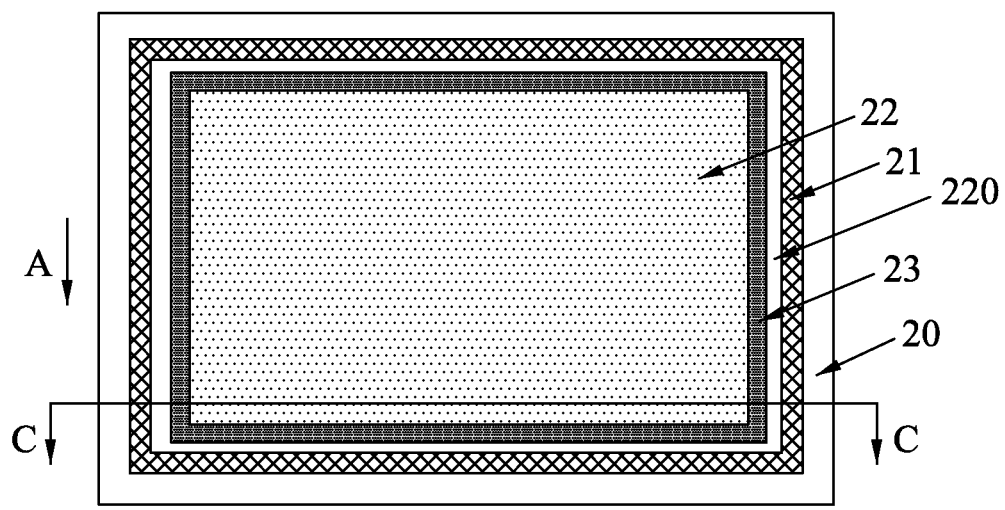
FIG. 4 is a schematic view of the TFT board having a barrier structure formed thereon in the coating method of the alignment film of the present invention.

Please refer to FIG. 4, FIG. 4 is a schematic view of a preferred embodiment of forming the barrier structure on the substrate 20 of the TFT board. In this embodiment, the barrier structure 23 is formed in the space 220 between the alignment liquid coating area 22 and the frame glue coating area 21, and the barrier structure 23 is built closely around the alignment liquid coating area 22 to block the alignment liquid to diffuse toward frame glue coating area 21.

In the specific implementation process, the barrier structure 23 may be formed by a nozzle coating way. The material of the barrier structure 23 may be a hardenable molding polymer material, particularly may be a polymer material being hardenable molded in air. The polymer material is preferably a single polymer material or a mixed polymer material. For example, the polymer material is α-amino acrylic acid ethyl ester.

Figure 5:
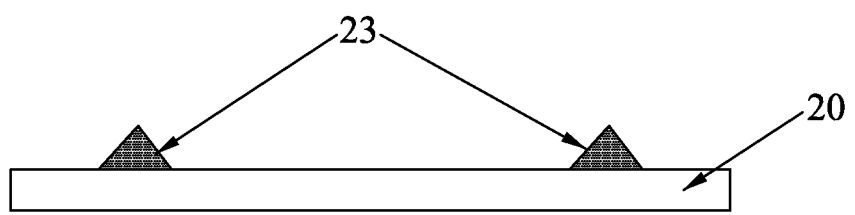
FIG. 5 is a cross section schematic view of one preferred embodiment of the formed barrier structure in the coating method of the alignment film of the present invention.

Please refer to FIG. 5, FIG. 5 is a cross section schematic view of a first preferred embodiment of the barrier structure 23, and it is a cross section schematic view along line C-C' in FIG. 4.

The cross section of the barrier structure 23 is perpendicular to a length direction A of the barrier structure 23. In FIG. 5, the barrier structure 23 is protruding with respect to the substrate 20, and the cross section of the barrier structure is a triangle.

Figure 6:
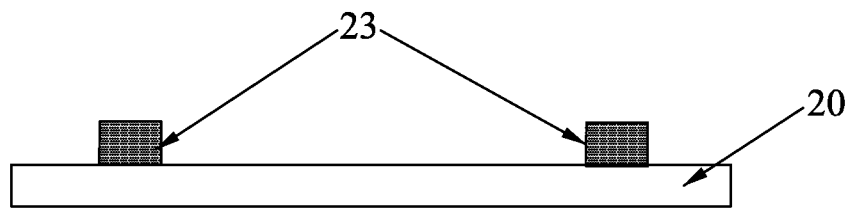
FIG. 6 is a cross section schematic view of another preferred embodiment of the formed barrier structure in the coating method of the alignment film of the present invention.

Certainly, the cross section of the barrier structure 23 can also be other shapes, such as a square or a trapezoid and so on, as long as they can block the alignment liquid of the alignment liquid coating area 22 to spread to other areas. Please refer to FIG. 6, in FIG. 6, the cross section of the barrier structure 23 is a square.

Please return to FIG. 2 again, in the step S203, it is coating the alignment liquid coating area 22 with the alignment liquid, wherein the barrier structure 23 blocks the alignment liquid to diffuse outside the alignment liquid coating area 22.

In the specific implementation process, the alignment liquid may be sprayed unto the alignment liquid coating area 22 of the substrate 20 by an inkjet (PI inkjet) printing technology. In addition, the alignment liquid may be coated on the alignment liquid coating area 22 by other technologies, here is not listed one by one.

Figure 7:
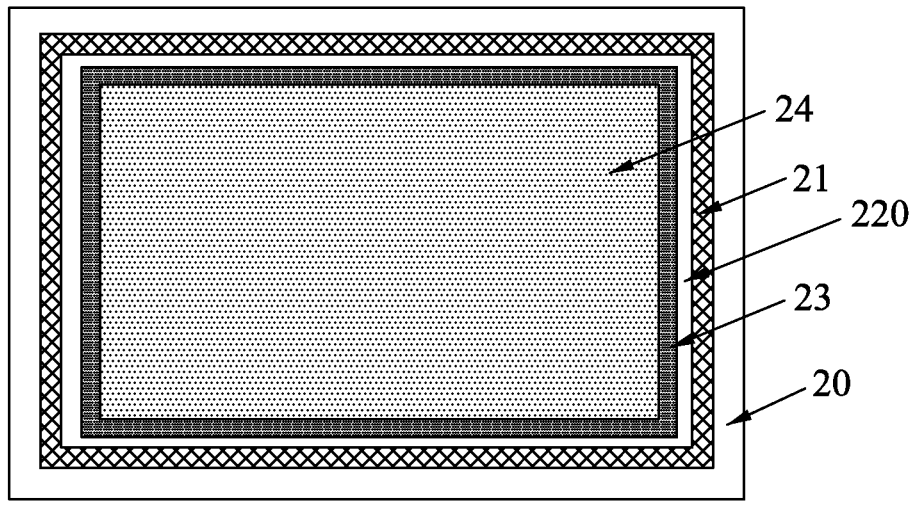
FIG. 7 is a structure schematic view of the TFT board after forming the alignment film thereon in the coating method of the alignment film of the present invention.

In the step S204, it is curing the alignment liquid to form the alignment film 24, please refer to FIG. 7.

The present invention cures the alignment liquid to form the alignment film by a baking and heating way. Surely, it may be other curing ways, such as lighting and so on.

Figure 8:
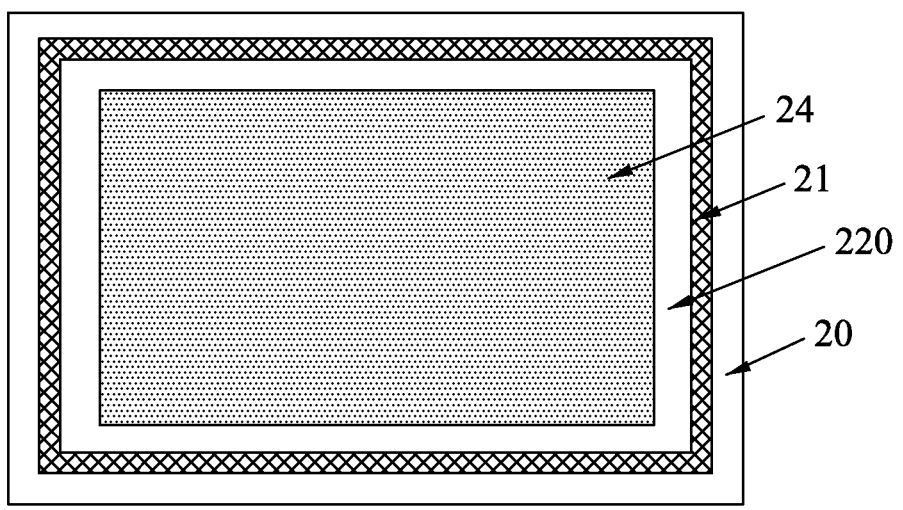
FIG. 8 is a structure schematic view of the TFT board after removing the barrier structure in the coating method of the alignment film of the present invention.

In the step S205, it is removing the barrier structure 23 to form a structure shown by FIG. 8.

In the specific implementation process, the barrier structure 23 can be removed by the following two ways:

A first is: heating the barrier structure 23 to melt the barrier structure 23, and pouring out the liquid from the substrate 20 after the barrier structure 23 being melted to the liquid, thereby realizing the removal of the barrier structure 23.

A second is: spraying a solvent 23 on the barrier structure 23 to dissolve the barrier structure 23 in the solvent and remove it. For example, when the material of the barrier substrate 23 is α-amino acrylic acid ethyl ester, the present invention may spray alcohol toward the barrier structure 23 for dissolving the barrier structure 23 in alcohol to form the liquid, and then the liquid is poured out from the substrate 20, thereby realizing the removal of the barrier structure 23.

Certainly, it also may adopt other ways to remove the barrier structure 23, such as directly etch the barrier structure 23 to remove it, so here is not listed one by one.

The coating method of the alignment film provided in the present invention is: first forming the barrier structure 23 around the alignment liquid coating area 22 on the substrate 20, then coating the alignment liquid in the alignment liquid coating area 22, wherein the barrier structure 23 blocks the alignment liquid to spread outside the alignment liquid coating area 22, and finally curing the alignment liquid to form the alignment film 24. Obviously, the coating method of the alignment film of the present invention may block the alignment liquid to diffuse by the barrier structure 23, thereby controlling the position precision of the alignment film 24, particularly the boundary precision of the alignment film 24, and assuring that the formed alignment film 24 can not affect other areas adjacent to the alignment liquid coating area.

In conclusion, although the present invention has been disclosed by above preferred embodiments, above preferred embodiments are not used to limit the present invention. One of ordinary skills in the art also can make all sorts of improvements and amendments within the principles of the present invention. Therefore, the protection scope of the present invention should be based on the scope defined by the appended claims.

What is claimed is:

1. A coating method of an alignment film, comprising following steps of:
   providing a board, having a substrate, the substrate forming an alignment liquid coating area and a frame glue coating area thereon, the frame glue coating area surrounding the alignment liquid coating area, and the alignment liquid coating area and the frame glue coating area defining a space therebetween;
   forming a barrier structure in the space between the alignment liquid coating area and the frame glue coating area, and the barrier structure being built closely around the alignment liquid coating area;
   coating an alignment liquid in the alignment liquid coating area, wherein the barrier structure blocks the alignment liquid to diffuse outside the alignment liquid coating area;
   curing the alignment liquid to form an alignment film; and
   removing the barrier structure.

2. The coating method of an alignment film as claimed in claim 1, wherein the barrier structure is formed by a hardenable molding polymer material.

3. The coating method of an alignment film as claimed in claim 2, wherein the polymer material is a single polymer material or a mixed polymer material.

4. The coating method of an alignment film as claimed in claim 2, wherein the polymer material is α-amino acrylic acid ethyl ester.

5. The coating method of an alignment film as claimed in claim 1, wherein the step of removing the barrier structure specifically comprises:
   heating the barrier structure for melting and removing the barrier structure.

6. The coating method of an alignment film as claimed in claim 1, wherein the step of removing the barrier structure specifically comprises:
   spraying a solvent on the barrier structure to dissolve the barrier structure in the solvent and remove it.

7. The coating method of an alignment film as claimed in claim 3, wherein the barrier structure is protruding with respect to the substrate, and a cross section of the barrier structure is perpendicular to a length direction of the barrier structure.

8. The coating method of an alignment film as claimed in claim 7, wherein the cross section of the barrier structure is a triangle, a square or a trapezoid.

9. A coating method of an alignment film, comprising following steps of:
   providing a board, having a substrate, the substrate forming an alignment liquid coating area thereon;
   forming a barrier structure around the alignment liquid coating area;
   coating an alignment liquid in the alignment liquid coating area, wherein the barrier structure blocks the alignment liquid to diffuse outside the alignment liquid coating area;
   curing the alignment liquid to form an alignment film; and
   removing the barrier structure.

10. The coating method of an alignment film as claimed in claim 9, wherein the barrier structure is formed by a hardenable molding polymer material.

11. The coating method of an alignment film as claimed in claim 10, wherein the polymer material is a single polymer material or a mixed polymer material.

12. The coating method of an alignment film as claimed in claim 10, wherein the polymer material is a-amino acrylic acid ethyl ester.

13. The coating method of an alignment film as claimed in claim 10, wherein the substrate further forms a frame glue coating area thereon, the frame glue coating area surrounds the alignment liquid coating area, and the alignment liquid coating area and the frame glue coating area define a space therebetween, the barrier structure is formed in the space between the alignment liquid coating area and the frame glue coating area, and the barrier structure is built closely around the alignment liquid coating area.

14. The coating method of an alignment film as claimed in claim 9, wherein the step of removing the barrier structure specifically comprises:
   heating the barrier structure for melting and removing the barrier structure.

15. The coating method of an alignment film as claimed in claim 9, wherein the step of removing the barrier structure specifically comprises:
   spraying a solvent on the barrier structure to dissolve the barrier structure in the solvent and remove it.

16. The coating method of an alignment film as claimed in claim 11, wherein the barrier structure is protruding with respect to the substrate, and a cross section of the barrier structure is perpendicular to a length direction of the barrier structure.

17. The coating method of an alignment film as claimed in claim 16, wherein the cross section of the barrier structure is a triangle, a square or a trapezoid.

\* \* \* \* \*